(12) United States Patent
Mänz et al.

(10) Patent No.: US 6,411,134 B1
(45) Date of Patent: Jun. 25, 2002

(54) SPIKE-FREE CLOCK SWITCHING

(75) Inventors: Martin Mänz, Eching; Georg Zöller, Steinebach, both of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/806,104

(22) PCT Filed: Sep. 23, 1999

(86) PCT No.: PCT/DE99/03058
§ 371 (c)(1),
(2), (4) Date: Mar. 28, 2001

(87) PCT Pub. No.: WO00/19302
PCT Pub. Date: Apr. 6, 2000

(30) Foreign Application Priority Data

Sep. 29, 1998 (DE) ......................... 198 44 671

(51) Int. Cl.$^7$ ............................... H03K 17/00
(52) U.S. Cl. ......................... 327/99; 327/298
(58) Field of Search ......................... 327/99, 100, 107, 327/144, 298, 355, 407

(56) References Cited

U.S. PATENT DOCUMENTS 4,855,615 A * 8/1989 Humpleman ............... 327/144
4,970,405 A 11/1990 Hagiwara ................... 327/145
5,099,141 A * 3/1992 Utsunomiya ................ 327/145
5,155,380 A * 10/1992 Hwang et al. .............. 327/176
5,652,536 A 7/1997 Nookala et al. ............ 327/298
5,926,044 A * 7/1999 Niimura .................... 327/298
5,969,558 A 10/1999 Abe .......................... 327/292
6,107,841 A * 8/2000 Goodnow ................... 327/298

FOREIGN PATENT DOCUMENTS

JP 1-150921 6/1989
JP 10-124167 5/1998

OTHER PUBLICATIONS

Patent Abstracts of Japan—10124167—May 5, 1998.
Patent Abstracts of Japan—01150921—Jun. 13, 1989.
IbM Technical Disclosure Bulletin, vol. 32, No. 98, Feb. 1990.

* cited by examiner

*Primary Examiner*—Kenneth B. Wells
*Assistant Examiner*—Linh Nguyen
(74) *Attorney, Agent, or Firm*—Bell, Boyd & Lloyd LLC

(57) ABSTRACT

A circuit for spike-free clock switching which offers asynchronous switching between two clock signals of the same frequency and of any desired phase angle, which is purely digital, which can be fully implemented in an integrated module, and which avoids spikes/glitches during switching.

1 Claim, 4 Drawing Sheets

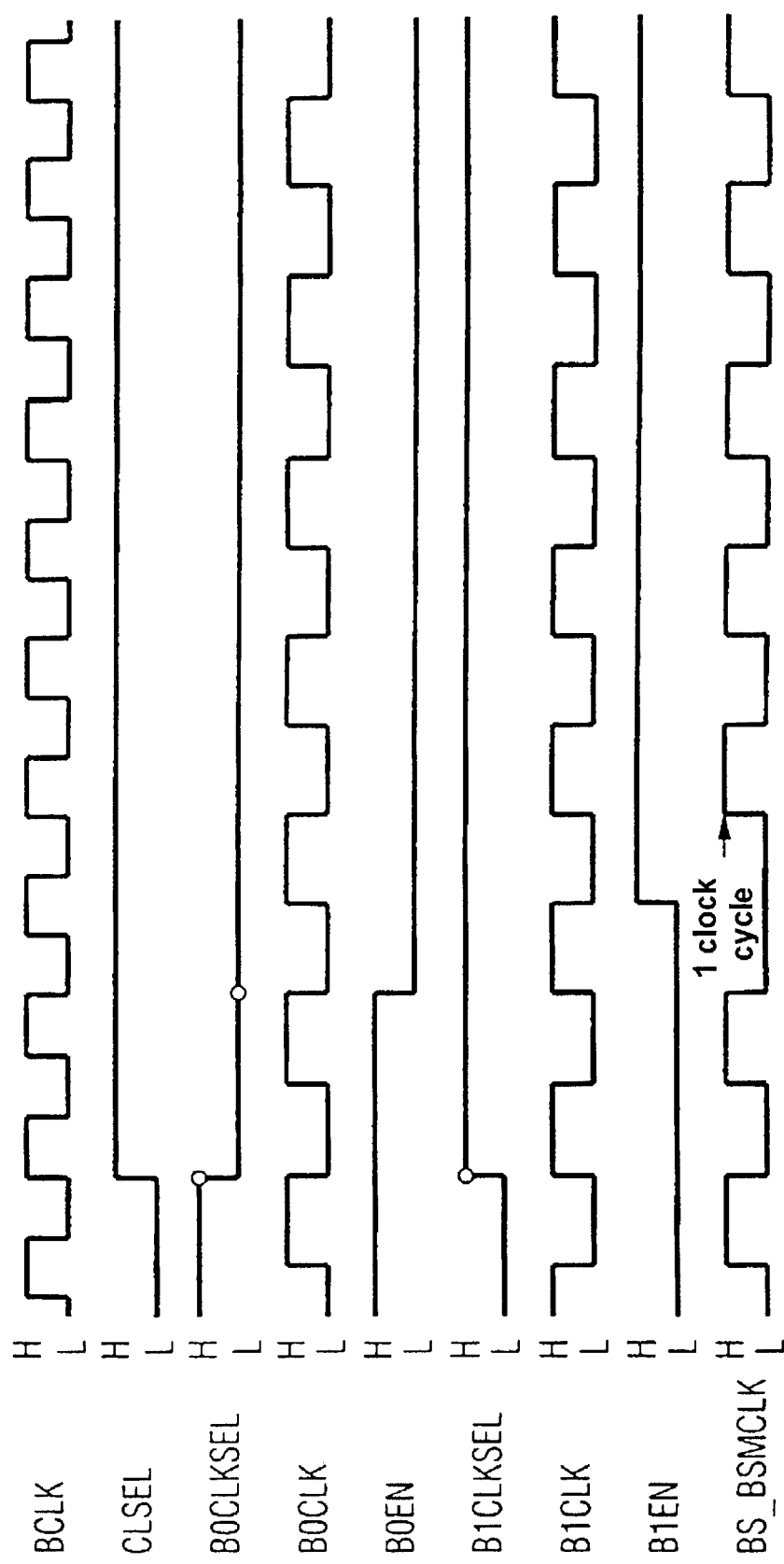

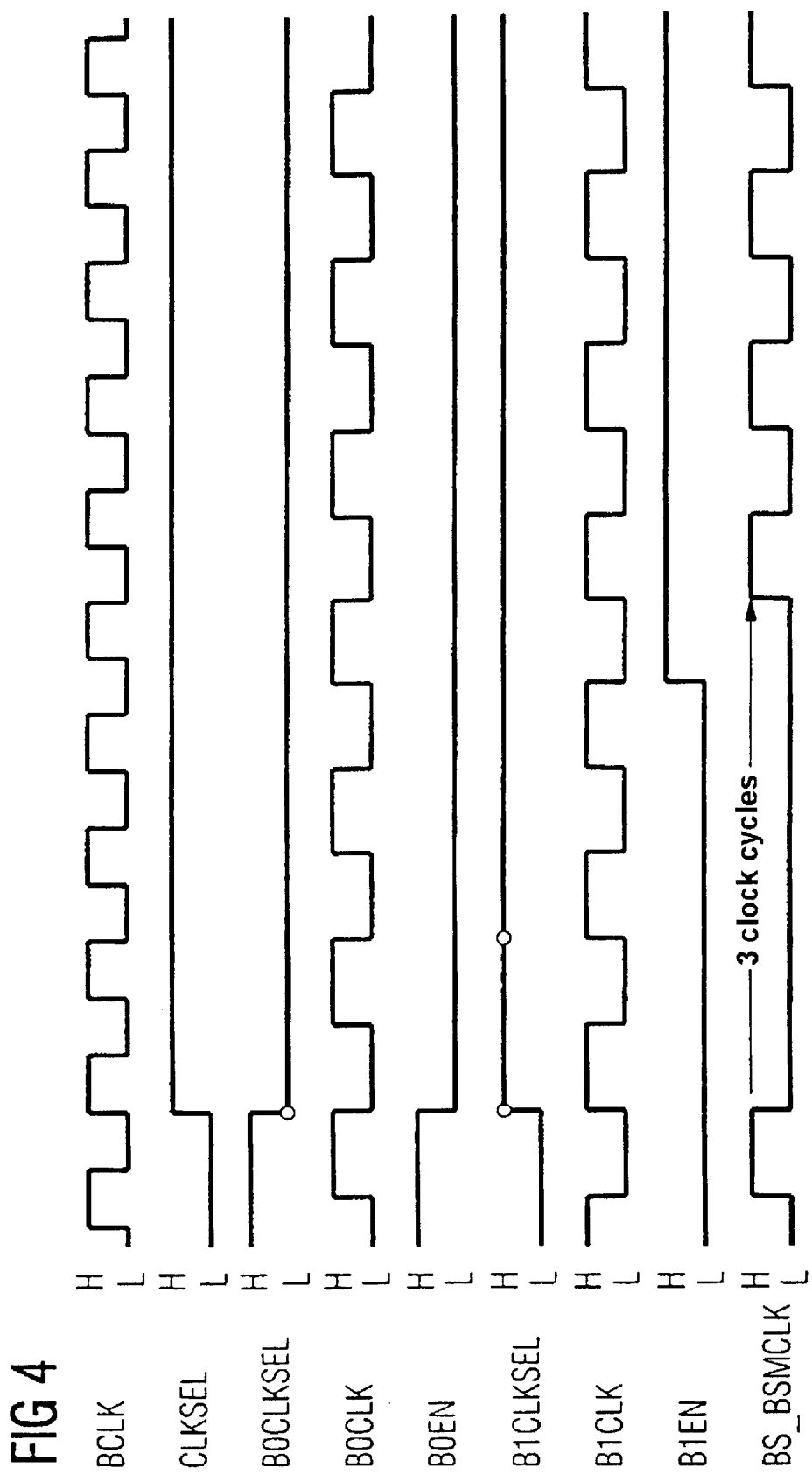

SPIKE-FREE CLOCK SWITCHING

BACKGROUND OF THE INVENTION

The present invention relates to a circuit for spike-free clock switching between clock signals which, as a digital circuit, can be fully implemented in an integrated circuit and which allows any desired phase angle of the clock signals.

In switching systems in which clock signals are duplicated for reasons of redundancy, the intention is to switch between the two clock signals of the same frequency and of any desired different phase angle without spikes/glitches occurring in the process.

This problem is conventionally solved by circuits which have a combination of monostable multivibrators with discrete components, such as resistors and capacitors for example. In these circuits, it becomes disadvantageously apparent that they cannot be fully implemented in an integrated circuit. The abovementioned objective also can be achieved via purely digital, fully integrable circuits, but they do not allow any desired phase angle of the clock signals.

The present invention is, therefore, directed to a circuit arrangement for switching between clock signals which, as a digital circuit, can be fully implemented in an integrated circuit and which allows any desired phase angle of the clock signals.

SUMMARY OF THE INVENTION

Accordingly, the inventive circuit for switching from a first clock signal to a second clock signal according to a clock select signal includes: a first circuit branch for a first clock signal, the first circuit branch having a first flip-flop, a second flip-flop, a third flip-flop, a first AND gate and a second AND gate, an output of the first flip-flop being connected to a data input of the second flip-flop, an output of the second flip-flop being connected to a second input of the first AND gate, an output of the first AND gate being connected to a data input of the third flip-flop, and an output of the third flip-flop being connected to a second input of the second AND gate, wherein an inversion of the clock select signal is fed as a select signal for the first clock signal to a data input of the fist flip-flop and to a first input of the first AND gate, wherein the first clock signal is fed to a clock input of the first flip-flop, a clock input of the second flip-flop, an inverting clock input of the third flip-flop and a first input of a second AND gate, and wherein an alarm signal associated with the first clock signal is applied to a reset input of the third flip-flop: a second circuit branch for a second clock signal, the second circuit branch having a fourth flip-flop, a fifth flip-flop, a sixth flip-flop, a third AND gate and a fourth AND gate, an output of the fourth flip-flop being connected to a data input of the fifth flip-flop, an output of the fifth flip-flop being connected to a second input of the third AND gate, an output of the third AND gate being connected to a data input of the sixth flip-flop, and an output of the sixth flip-flop being connected to a second input of the fourth AND gate, wherein the clock select signal is fed as a select signal for the second clock signal to a data input of the fourth flip-flop and to a first input of the third AND gate, wherein the second clock signal is fed to a clock input of the fourth flip-flop, a clock input of the fifth flip-flop, an inverting clock input of the sixth flip-flop, and a first input of the fourth AND gate, and wherein an alarm signal associated with a second clock signal is applied to a reset input of the sixth flip-flop; and a combination element having a first input connected to an output of the second AND gate, a second input connected to an output of the fourth AND gate, and an output connected to an output clock signal.

Accordingly, the circuit of the present invention is purely digital and requires no discrete components at all. Thus, it can be implemented in an integrated circuit such as, for example, an ASIC (Application Specific Integrated Circuit) or an FPGA (Flash Programmable Gate Array). An asynchronous signal for switching between the clock signals can be applied to the circuit arrangement. The clock signals have any desired phase angle.

Additional features and advantages of the present invention are described in, and will be apparent from, the following Detailed Description of the Invention and the Figures.

DESCRIPTION OF THE FIGURES

FIG. 3 shows a signal state diagram of possible states of individual signals in the case of switching from one clock signal to another clock signal.

FIG. 4 shows a state diagram of other possible states of individual signals in the case of switching from one clock signal to another clock signal.

DETAILED DESCRIPTION OF THE INVENTION

The clock selection circuit CS, to which are fed, on the input side, a clock select signal CLKSEL, a first clock signal B0CLK, a second clock signal B1CLK, a first clock alarm signal B0CLKALA and a second clock alarm signal B1CLKALA, outputs the output clock signal BS_BCMCLK on the output side.

Figure 1:
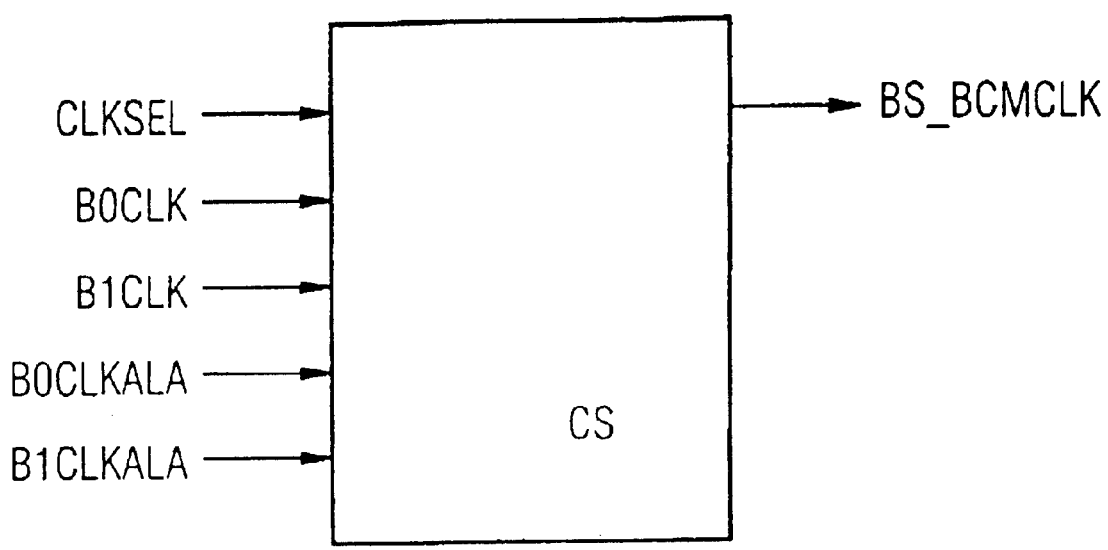
FIG. 1 shows a block diagram of a circuit for switching between clock signals.
Figure 2:
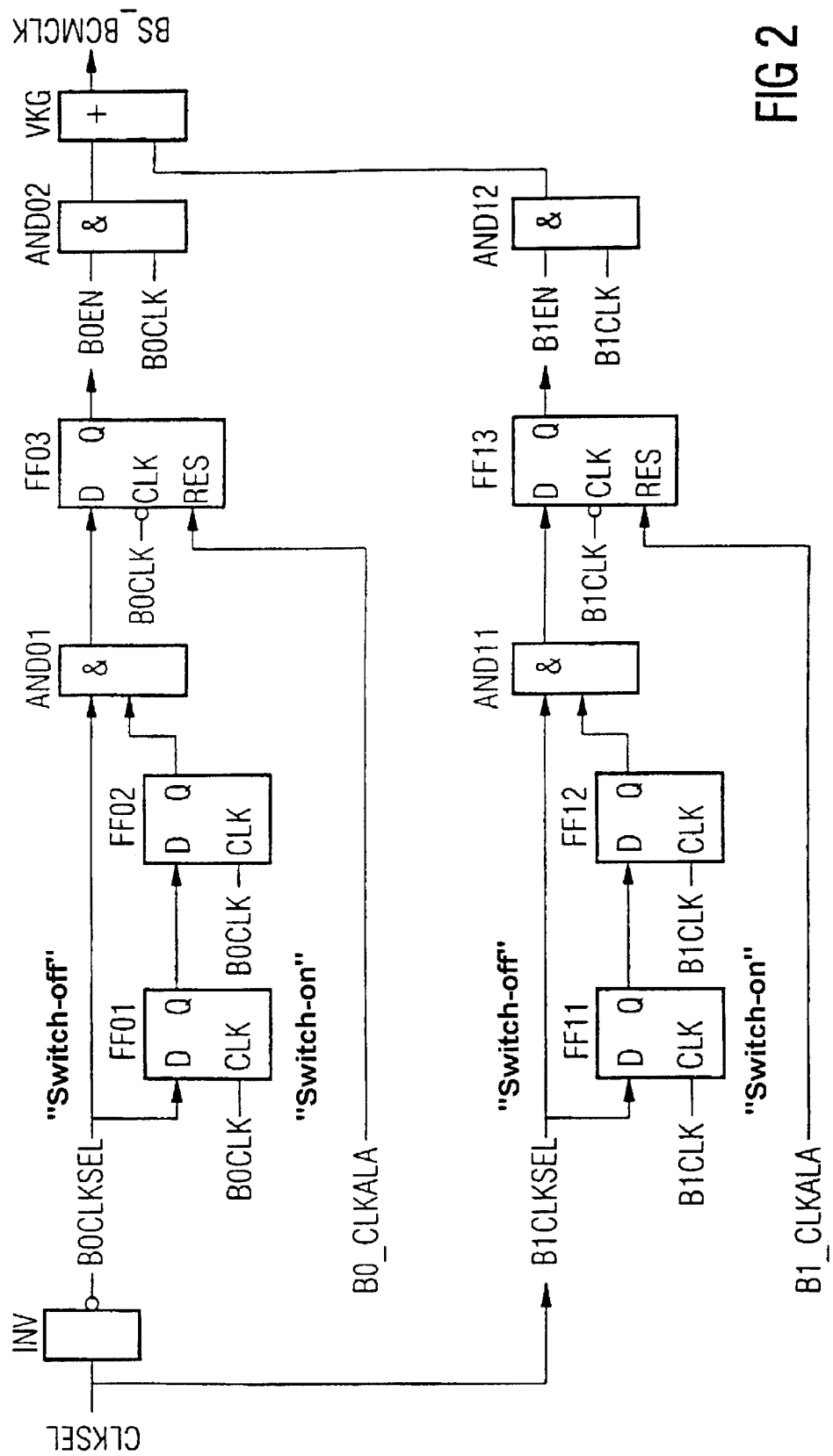
FIG. 2 shows a circuit diagram of a circuit of the present invention for switching between clock signals at the gate level.

The clock selection circuit in FIG. 2 has two identical circuit sections, the first circuit section illustrated at the top being assigned to the first clock signal and the second circuit section illustrated at the bottom being assigned to the second clock signal. The clock select signal CLKSEL is fed to the second circuit section as second clock select signal B1CLKSEL and, having been inverted via an inverter INV, is fed to the first circuit section as first clock select signal B0CLKSEL. The first clock select signal B0CLKSEL is fed to the data input D of a flip-flop FF 01 in the first circuit section, and the first clock signal B0CLK is fed to the clock input of the flip-flop. The signal output from the first flip-flop at the output Q is fed to the data input D of a second flip-flop FF02 in the first circuit section, and the clock signal B0CLK is fed to the clock input CLK of the flip-flop. The first clock select signal B0CLKSEL and the signal output at the output Q of the flip-flop FF02 are fed to inputs of a logic AND gate AND01. The signal output by the AND gate AND01 is applied to that input of a flip-flop FF03 which is designed by D, the first clock signal B0CLK is applied to the inverting clock input CLK of the flip-flop, and the first alarm signal B0CLKALA of the first clock signal B0CLK is applied to the reset input RES of the flip-flop. The signal output by the flip-flop FF3 at its output Q forms an enable signal BOEN for the first clock signal B0CLK. The, enable signal B0EN for the first clock signal B0CLK and the first clock signal B0CLK are fed to inputs of a logic AND gate AND02.

In principle, the second circuit section for the second clock signal is constructed identically to the first circuit section for the first clock signal.

A combination element VKG, to which are fead, on the input side, the signals output by the AND gate AND02 and the AND gate AND12, outputs the selected clock signal BS_BCMCLK at its output. As emerges from FIGS. 3 and 4, the clock switching is effected in two phases. If the clock signals are switched, which is represented in FIGS. 3 and 4 in row B0CLKSEL by a state change in the clock select signal from the logic high level (H) to the logic low level (L), the clock signal (the, first clock signal B0CLK in FIG. 3 and FIG. 4) that has heretofore been activated as the output clock signal is switched off with the first falling edge of this clock signal. In the switching process, the clock signal (the clock signal B1CLK in FIG. 3 and FIG. 4) that has heretofore not been activated as the output clock signal is switched on during its logic low level. The switch-on is effected with a delay which results in a clock gap of, as illustrated in FIG. 3, not less than one clock period and, as illustrated in FIG. 4, not more than three clock periods.

As emerges from FIGS. 3 and 4, the first clock signal and the second clock signal may be provided by mutually complementary clock signals. The circuit arrangement ensures that in the case of an active clock alarm signal, switching to the associated clock signal cannot be effected.

Although the present invention has been described with reference to specific embodiments, those of skill in the art will recognize that changes may be made thereto without departing from the spirit and scope of the invention as set forth in the hereafter appended claims.

What is claimed is:

1. A circuit for switching from a first clock signal to a second clock signal according to a clock select signal, the circuit comprising:

a first circuit branch for a first clock signal, the first circuit branch including a first flip-flop, a second flip-flop, a third flip-flop, a first AND gate and a second AND gate, an output of the first flip-flop being connected to a data input of the second flip-flop, an output of the second flip-flop being connected to a second input of the first AND gate, an output of the first AND gate being connected to a data input of the third flip-flop, and an output of the third flip-flop being connected to a second input of the second AND gate, wherein an inversion of the clock select signal is fed as a select signal for the first clock signal to a data input of the first flip-flop and to a first input of the first AND gate, wherein the first clock signal is fed to a clock input of the first flip-flop, a clock input of the second flip-flop, an inverting clock input of the third flip-flop and a first input of the second AND gate, and wherein an alarm signal associated with the first clock signal is applied to a reset input of the third flip-flop;

a second circuit branch for a second clock signal, the second circuit branch including a fourth flip-flop, a fifth flip-flop, a sixth flip-flop, a third AND gate and a fourth AND gate, an output of the fourth flip-flop being connected to a data input of the fifth flip-flop, an output of the fifth flip-flop being connected to a second input of the third AND gate, an output of the third AND gate being connected to a data input of the sixth flip-flop, and an output of the sixth flip-flop being connected to a second input of the fourth AND gate, wherein the clock select signal is fed as a select signal for the second clock signal to a data input of the fourth flip-flop and to a first input of the third AND gate, wherein the second clock signal is fed to a clock input of the fourth flip-flop, a clock input of the fifth flip-flop, an inverting clock input of the sixth flip-flop, and a first input of the fourth AND gate, and wherein an alarm signal associated with a second clock signal is applied to a reset input of the sixth flip-flop; and a combination element having a first input connected to an output of the second AND gate, a second input connected to an output of the fourth AND gate, and an output connected to an output clock signal.

* * * * *